(12) United States Patent
Kadokawa et al.

(10) Patent No.: US 9,267,538 B2
(45) Date of Patent: Feb. 23, 2016

(54) ROLLING SLIDING PARTS

(75) Inventors: Satoshi Kadokawa, Kanagawa (JP);
Noriyuki Takeo, Kanagawa (JP)

(73) Assignee: NSK LTD., Tokyo (JP)

( * ) Notice: Subject to any disclaimer, the term of this patent is extended or adjusted under 35 U.S.C. 154(b) by 2894 days.

(21) Appl. No.: 10/590,008

(22) PCT Filed: Feb. 18, 2005

(86) PCT No.: PCT/JP2005/002596
§ 371 (c)(1),
(2), (4) Date: Aug. 21, 2006

(87) PCT Pub. No.: WO2005/080828
PCT Pub. Date: Sep. 1, 2005

(65) Prior Publication Data
US 2008/0034916 A1    Feb. 14, 2008

(30) Foreign Application Priority Data

Feb. 20, 2004 (JP) .............................. P. 2004-043962
Nov. 30, 2004 (JP) .............................. P. 2004-345143
Feb. 7, 2005 (JP) ................................. 2005-030254

(51) Int. Cl.
*F16C 13/00* (2006.01)
*F01L 1/18* (2006.01)
*F16H 53/06* (2006.01)

(52) U.S. Cl.
CPC ............... *F16C 13/006* (2013.01); *F01L 1/181* (2013.01); *F01L 2103/00* (2013.01); *F01L 2105/00* (2013.01); *F16H 53/06* (2013.01); *Y10T 74/2107* (2015.01)

(58) Field of Classification Search
USPC .......... 74/559, 569, 567; 384/625; 123/90.39, 123/90.44
IPC .................................................. F01L 1/18, 1/16
See application file for complete search history.

(56) References Cited

U.S. PATENT DOCUMENTS

| 4,509,803 A | 4/1985 | Takenaka et al. |
| 5,885,690 A | 3/1999 | Sada |
| 5,997,988 A * | 12/1999 | Sada .............................. 428/141 |

FOREIGN PATENT DOCUMENTS

| JP | 60-88016 U | 6/1985 |
| JP | 1-30008 B2 | 6/1989 |
| JP | 3-117723 A | 5/1991 |
| JP | 3-117724 A | 5/1991 |

(Continued)

OTHER PUBLICATIONS

European Office Action dated Aug. 11, 2009.

*Primary Examiner* — Daniel Yabut
(74) *Attorney, Agent, or Firm* — Sughrue Mion, PLLC

(57) ABSTRACT

The finishing process is applied to a surface of a roller 8 constituting a cam follower unit by the barrel finishing. When a position of a highest portion out of fine roughnesses existing on the surface is assumed as an outermost surface position, an occupation ratio of a sectional area of a virtual plane in a plane direction at a portion that is positioned at a depth of 2.0 μm from the outermost surface position to an area of an overall surface of a portion that contacts the other member is set to 90% or more. With this configuration, a tough oil film can be formed between the surface of the roller 8 and the other member, and also the improvement of durability of a member such as the roller 8, or the like, which contacts the other member via a rolling contact or a sliding contact, can be achieved at a low cost.

30 Claims, 11 Drawing Sheets

(56) References Cited

FOREIGN PATENT DOCUMENTS

| | | |
|---|---|---|
| JP | 3-117725 A | 5/1991 |
| JP | 5-10108 A | 1/1993 |
| JP | 9-42293 A | 2/1997 |
| JP | 2001-280106 A | 10/2001 |
| JP | 2001-304267 A | 10/2001 |
| JP | 2002-4003 A | 9/2002 |
| JP | 3496286 B2 | 11/2003 |
| WO | WO 97/19279 A1 | 5/1997 |

* cited by examiner

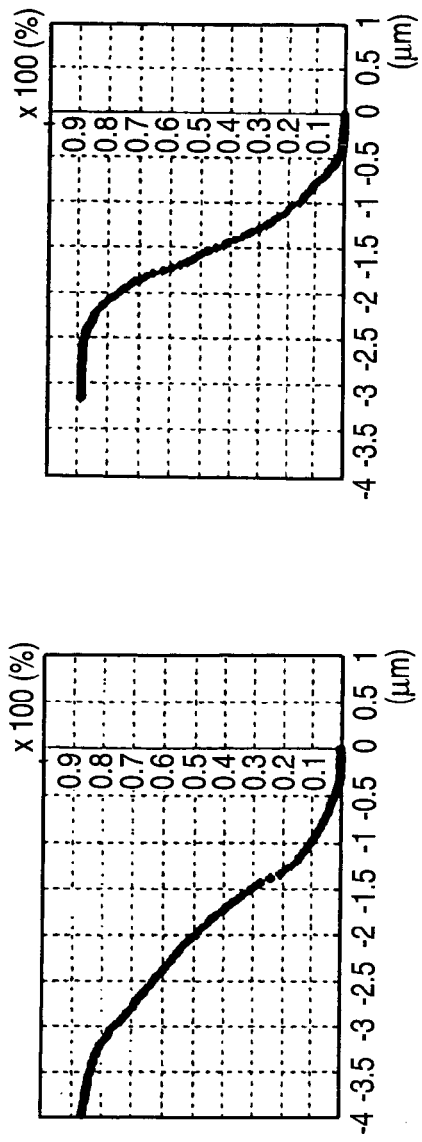
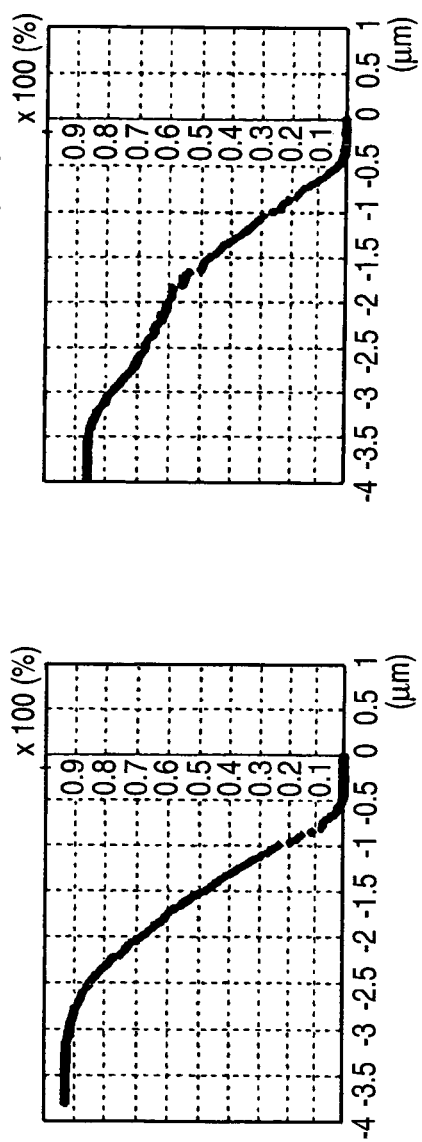
FIG. 8(F) FIG. 8(G) FIG. 8(H) FIG. 8(I)

ROLLING SLIDING PARTS

CROSS REFERENCE TO RELATED APPLICATION

This application is a U.S. national phase application under 35 U.S.C. §371 of International Application No. PCT/JP05/02596 filed Feb. 18, 2005, which claims priority to JP 2004-043962 filed Feb. 20, 2004; JP 2004-345143 filed Nov. 30, 2004; and JP 2005-030254 filed Feb. 7, 2005, all of which are herein incorporated by reference in their entirety.

TECHNICAL FIELD

The present invention relates to improvements in the rolling sliding parts whose surface is relatively displaced from the other member in use, i.e., contacts the other member via a rolling contact or a sliding contact, and realizes a rolling sliding parts that can be manufactured at a low cost and can have excellent durability.

As such rolling sliding parts as the object of the present invention, for example, the parts shown in following (a) to (c) are considered.

(a) The roller constituting the cam follower unit used in the valve operating mechanism of various engines.

(b) The rocker arm into a part of which the cam follower unit is incorporated.

(c) The inner ring having the cylindrical inner ring raceway on its outer peripheral surface or the shaft.

BACKGROUND ART

The valve operating mechanism is used to transfer a motion of the came fixed to the camshaft, which rotates in synchronism with the crankshaft of the engine, to the valve. In order to suppress a friction loss of the relevant portion lower and attain the improvement in fuel consumption performance, in recent years the cam follower unit set forth in Patent Literature 1, for example, is widely used to change the friction in operation from a sliding friction to a rolling friction in this valve operating mechanism. FIG. 1 and FIG. 2 show an example of such cam follower unit. A rocker arm 1 as a main body of the cam follower is supported rotatably in the engine main body (not shown) of the internal combustion engine by a rocker shaft 3 that is inserted into a shaft hole 2 provided in the middle portion in the lengthwise direction (the lateral direction in FIG. 1). Also, an adjust bolt 4 is screwed into a threaded hole formed in a base end portion and is locked by a locknut 5, and thus is fixed to this base end portion (left end portion in FIG. 1) of the rocker arm 1. Also, a base end face (upper end face in FIG. 1) of an engine valve 6 as the suction valve or the exhaust valve, which is supported in the engine main body (not shown) to move reciprocally, is brought into contact with a top end face (lower end face in FIG. 1) of the adjust bolt 4. The engine valve 6 is always energized by a valve spring 7 in the valve closing direction (direction to contact the adjust bolt 4). Therefore, elasticity is given to the rocker arm 1 in the clockwise direction in FIG. 1.

Meanwhile, a roller 8 is fitted rotatably to a top end portion (right end portion in FIG. 1) of the rocker arm 1 via a roller supporting shaft 9, and an outer peripheral face of the roller 8 is brought into contact with an outer peripheral face of a cam 10 by the spring force of the valve spring 7. This cam 10 is formed integrally with a camshaft 11 that rotates together with a crankshaft (not shown), and is supported rotatably in the engine main body. According to this structure, the rotation of the camshaft 11 is converted into the reciprocal swing motion of the rocker arm 1 around the rocker shaft 3, and also the engine valve 6 is moved reciprocally against the spring force of the valve spring 7 or based on the spring force by the rocker arm 1. Then, the opening/closing action of the suction valve or the exhaust valve provided to the cylinder top portion of the engine main body is executed.

In such valve operating mechanism, the portion for supporting rotatably the roller 8 onto the rocker arm 1 via the roller supporting shaft 9 is constructed as shown in FIG. 2. The roller supporting shaft 9 is put across a pair of supporting walls 12, 12 provided in parallel mutually at a distance to the top end portion of the rocker arm 1. Then, the roller 8 is supported rotatably around the center portion, which is positioned between inner surfaces of both supporting walls 12, 12, of the roller supporting shaft 9 via a plurality of needles 13, 13. Both end portions of the roller supporting shaft 9 are fitted into roller shaft holes 14, 14 provided concentrically in the supporting walls 12, 12 respectively, and are supported therein. In this state, outer peripheral portions of the roller supporting shaft 9 on both ends are plastically deformed outward in the radial direction by hitting the top end edge of the caulking jig such as the punch, or the like against both end faces on the outer diameter side. Thus, the roller supporting shaft 9 is coupled/fixed firmly to the roller shaft holes 14, 14.

Also, with respect to the parts that contacts the other member in terms of the rolling contact in use, like the roller incorporated into the cam follower unit as the object of the present invention, the technology concerning the improvement in surface properties of the parts, which contacts the other member in terms of the rolling contact, to improve durability of a flaking life, or the like is set forth in Patent Literature 2, etc., for example. Various technologies are known in the prior art. In the case of the technology set forth in Patent Literature 2 in the prior art, an abrasion whose surface roughness Rmax is 0.3 to 1.5 $\mu$m in the random direction is formed on a rolling surface of the rolling element of the bearing, and also a residual stress layer of 500 MPa or more is formed on a surface layer portion. Also, the invention is set forth in Patent Literatures 3 to 5 that a hardness of the surface layer portion is set higher than that of the inside by forming a large number of depressions on the surface by virtue of the barrel finishing, and also a compressive residual stress is generated on the surface layer portion.

The above technologies known in the prior art to improve the durability can achieve the effect in their own way, but there is yet room for improvement from an aspect of ensuring excellent durability at a low cost. In other words, it is preferable from an aspect of suppressing a cost that the surface finish should be executed by not the polishing, or the like, as set forth in Patent Literatures 3 to 5, but the barrel finishing. In this case, when the surface finish is executed by the barrel finishing, the enough durability cannot always be secured under severe conditions unless the properties of minute depressions existing on the surface are proper. That is, it is found by the inventor's study of the present invention that, even when the surface of the cam follower unit is finished simply by the barrel finishing, a sufficiently tough oil film cannot be formed between the faces that contact mutually via a rolling contact.

For example, when the machining conditions in the barrel finishing are not properly chosen to result in a large surface roughness (deep depressions exist on a surface), a part of the oil that is pushed strongly between two faces that contact mutually via a rolling contact escapes from a clearance between the contacting faces to their peripheries, so that a strength of the oil film existing between two faces is lowered. Also, in the cam follower unit for the valve operating mechanism of the engine, a thickness of the oil film that has the large strength to such an extent that it can be prevented that metal contact is generated at the rolling contact portion between outer peripheral surfaces of the roller and the cam is about 1 µm at best. Therefore, when the large projection (which projects largely outward) is present partially, the metal contact takes place between the top portion of this projection and the opponent face, so that an early flaking is easily generated based on a peeling from that portion.

Such problem also arises in other members that are displaced relatively (contact in terms of a rolling contact or a sliding contact) while contacting the surface of the other member at a large face pressure. For example, in the foregoing structure shown in FIGS. 1 and 2, since the cylindrical inner ring raceway portion formed on the outer peripheral surface of the center portion of the roller supporting shaft 9 contacts the rolling surfaces of the needles 13, 13 in terms of a rolling contact at a large contact face pressure, it is possible that satisfactory durability cannot be secured unless the surface properties are proper. Also, in the rocker arm constituting the cam follower unit, the similar problem arises in the structure that the rocker arm sliding-contacts the other member at a high face pressure.

FIGS. 3 and 4 show the sheet metal rocker arm set forth in Patent Literature 6, as an example of a rocker arm 1a in which such problem will arise. The rocker arm 1a is formed by applying the punching and the bending to a sheet of metal plate while using the press. Circular holes 19, 19 into which both end portions of the roller supporting shaft to support the roller 8 are fitted and fixed are formed in the center portion of the rocker arm 1a. A first engaging portion 20 as a partial cylindrical convex face against which the base end face of the engine valve 6 (see FIG. 1) is hit is formed in one end portion (right end portion in FIGS. 3 and 4) of the same. A second engaging portion 21 as a hemispherical concave face against which the top end face of the rush adjuster is hit is formed on the other end of the same.

Such first and second engaging portions 20, 21 are slid minutely over the other face respectively while they come onto contact with the base end face of the engine valve 6 or the top end face of the rush adjuster at a high face pressure in their using condition. Therefore, if the surface properties of the first and second engaging portions 20, 21 are not proper, the metal contact occurs between these engaging portions 20, 21 and the other face when the working conditions are severe, e.g., the lubricating oil supplied to butt faces of these engaging portions 20, 21 and the other face runs short, or the like. Thus, an early flaking is ready to generate based on a peeling from that portion.

Also, as the invention to improve a rolling contact fatigue life of the cylindrical inner ring raceway that exists on the outer peripheral surface of the shaft, such a technology is set forth in Patent Literature 7 that the shaft is made of a steel that contains C of 0.5 to 1.2 wt % and N of 0.05 to 0.4 wt %, the surface layer having a hardness of Hv650 or more and containing a retained austenite of 15 to 40 vol % is formed by the induction hardening process, and a retained austenite in the core portion is set to 0 vol %. In the case of such technology in the prior art, the sufficient durability cannot always be secured when the lubricating conditions are severe. In addition, the technology to form a reaction layer made of phosphate compound consisting of phosphorus and iron on one or both of the inner peripheral surface of the roller constituting the cam follower unit and the outer peripheral surface of the shaft and then stack the process layer, which is obtained by burning a mixture of molybdenum disulfide and poly(tetrafluoroethylene) together with a thermosetting synthetic resin using polyamideimide as the binder, on a surface of this reaction layer is set forth in Patent Literature 8. According to such technology in the prior art, both peripheral surfaces can be protected until the lubricating oil spreads to the contact area of both peripheral surfaces immediately after the running of the engine is started. However, since the process layer is worn out within a relatively short time after the running of the engine is started, such process layer is seldom helpful in protecting the surface of the rolling sliding parts in the lubricating oil insufficient state that is generated after a certain time has elapsed from the start of the running.

Patent Literature 1: Japanese utility model publication Bo. Sho. 60-88016

Patent Literature 2: Publication of Japanese translation of International application No. Hei. 1-30008

Patent Literature 3: Japanese patent unexamined publication No. Hei. 3-117723

Patent Literature 4: Japanese patent unexamined publication No. Hei. 3-117724

Patent Literature 5: Japanese patent unexamined publication No. Hei. 3-117725

Patent Literature 6: Japanese patent unexamined publication No. 2001-280106

Patent Literature 7: Japanese patent unexamined publication No. 2002-4003

Patent Literature 8: Japanese Patent No. 3496286

DISCLOSURE OF THE INVENTION

Problems that the Invention is to Solve

The present invention is made in view of the above circumstances to realize a rolling sliding parts that can be manufactured at a low cost and can have excellent durability.

Means for Solving the Problems

All the rolling sliding parts of the present invention have the surface that contacts the other member via a rolling contact or a sliding contact in use, and this surface is subjected to the finishing process by the barrel finishing, for example.

First, in the case of the rolling sliding parts of the first invention, when a position of a highest portion out of fine roughnesses existing on the surface is assumed as an outermost surface position, an occupation ratio of a sectional area of a virtual plane in a plane direction at a portion that is positioned at a depth of 2.0 µm from the outermost surface position to an area of an overall surface of a portion that contacts the other member is set to 90% or more.

Also, in the case of the rolling sliding parts of the second invention, when a position of a highest portion out of fine roughnesses existing on the surface is assumed as an outermost surface position, an occupation ratio of a sectional area of a virtual plane in a plane direction at a portion that is positioned at a depth of 1.5 µm from the outermost surface position to an area of an overall surface of a portion that contacts the other member is set to 80% or more.

In addition, in the case of the rolling sliding parts of the second invention, when a position of a highest portion out of fine roughnesses existing on the surface is assumed as an outermost surface position, an occupation ratio of a sectional area of a virtual plane in a plane direction at a portion that is positioned at a depth of 1.0 µm from the outermost surface position to an area of an overall surface of a portion that contacts the other member is set to 50% or more.

Here, any dimension may be available if the above dimension can be satisfied per unit area (for example, 1 mm²) observed by a microscope or a roughness measuring instrument.

The wording "a sectional area of a virtual plane in a plane direction at a portion that is positioned at a depth of x μm from the outermost surface position" signifies an area cut by this virtual plane in a situation that the virtual plane extending in the plane direction at the portion that is positioned at a depth of x μm from the outermost surface position is assumed. Also, the wording "an area of an overall surface of a portion that contacts the other member" signifies an area obtained when this surface is assumed a flat surface (an increase of the area caused due to the presence of an inclined portion is corrected).

Advantages of the Invention

According to the present invention constructed as above, the rolling sliding parts that can be manufactured at a low cost and can have excellent durability can be realized.

First, since the finishing process of the surface of the rolling sliding parts is executed by not the troublesome polishing or shot peening but the barrel finishing that can finish a great number of rolling sliding parts at a time without the particular troublesome work, for example, a reduction in cost can be attained.

Also, since no deep depression is formed or deep depressions if formed are suppressed within a minute area, the improvement of durability can be achieved. If no deep depression is formed or deep depressions if formed are suppressed within a minute area, generation of the metal contact that results in an early flaking at that portion can be prevented by enhancing a strength of the oil film that exists between the surface of the rolling sliding parts and the other member.

BRIEF DESCRIPTION OF THE DRAWINGS

FIGS. 8(A) to (I) Graphs obtained by classifying distributions of the surface structures.

DESCRIPTION OF REFERENCE NUMERALS AND SIGNS

Figure 1:
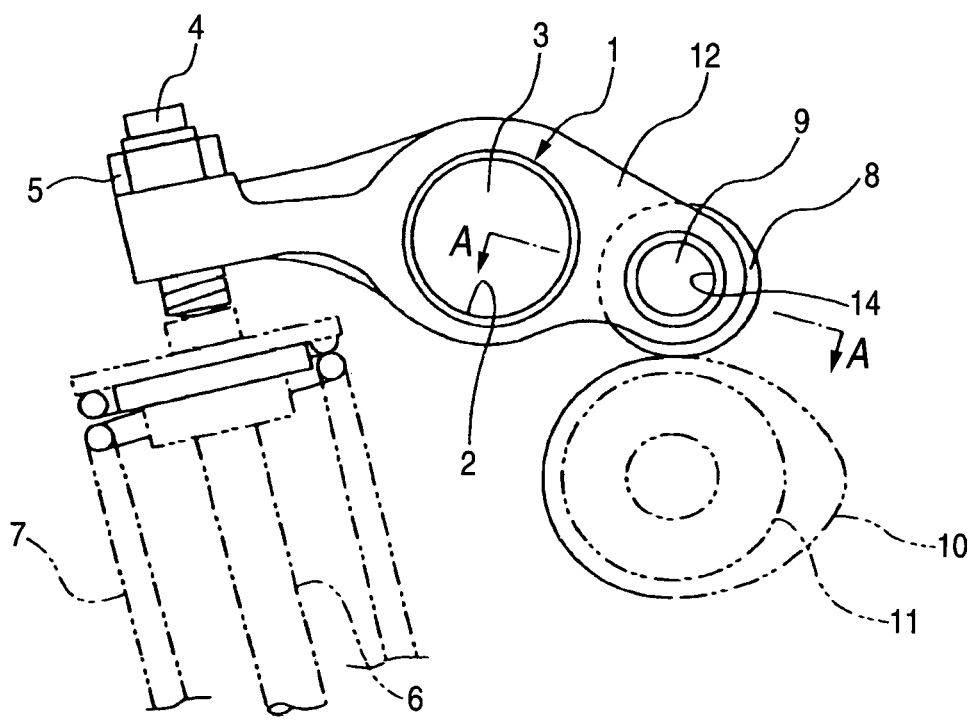
FIG. 1 A side view showing an example of the cam follower unit into which the roller as one type of the rolling sliding parts as the object of the present invention is incorporated.

1, 1a rocker arm
2 shaft hole
3 rocker shaft
4 adjust bolt
5 locknut
6 engine valve
7 valve spring
8 roller
9 roller supporting shaft
10 cam
11 camshaft
12 supporting wall
13 needle
14 roller shaft hole
15 main shaft
16 driving roller
17 supporting member
18 pot
19 circular hole
20 first engaging portion
21 second engaging portion

BEST MODE FOR CARRYING OUT THE INVENTION

An embodiment of the present invention is constructed to provide a rolling sliding parts a surface of which contacts other member via a rolling contact or a sliding contact in use, wherein, when a position of a highest portion out of fine roughnesses existing on the surface is assumed as an outermost surface position, an occupation ratio of a sectional area of a virtual plane in a plane direction at a portion that is positioned at a depth of 2.0 μm from the outermost surface position to an area of an overall surface of a portion that contacts the other member is set to 90% or more.

Also, it is preferable that an occupation ratio of a sectional area of a virtual plane in a plane direction at a portion that is positioned at a depth of 1.5 μm from the outermost surface position to an area of an overall surface of a portion that contacts the other member should be set to 80% or more.

Alternately, it is preferable that an occupation ratio of a sectional area of a virtual plane in a plane direction at a portion that is positioned at a depth of 1.0 μm from the outermost surface position to an area of an overall surface of a portion that contacts the other member should be set to 50% or more.

Alternately, it is preferable that an occupation ratio of a sectional area of a virtual plane in a plane direction at a portion that is positioned at a depth of 1.5 μm from the outermost surface position to an area of an overall surface of a portion that contacts the other member should be set to 80% or more, and also an occupation ratio of a sectional area of a virtual plane in a plane direction at a portion that is positioned at a depth of 1.0 μm from the outermost surface position to an area of an overall surface of a portion that contacts the other member should be set to 50% or more.

Also, another embodiment of the present invention is constructed to provide a rolling sliding parts a surface of which contacts other member via a rolling contact or a sliding contact in use, wherein, when a position of a highest portion out of fine roughnesses existing on the surface is assumed as an outermost surface position, an occupation ratio of a sectional area of a virtual plane in a plane direction at a portion that is positioned at a depth of 1.5 μm from the outermost surface position to an area of an overall surface of a portion that contacts the other member is set to 80% or more.

Also, still another embodiment of the present invention is constructed to provide a rolling sliding parts a surface of which contacts other member via a rolling contact or a sliding contact in use, wherein, when a position of a highest portion out of fine roughnesses existing on the surface is assumed as an outermost surface position, an occupation ratio of a sectional area of a virtual plane in a plane direction at a portion that is positioned at a depth of 1.0 µm from the outermost surface position to an area of an overall surface of a portion that contacts the other member is set to 50% or more.

If such configuration is employed, generation of the metal contact that yields an early flaking at that portion can be prevented by enhancing a strength of the oil film that exists at the contact portion between the surface of the rolling sliding parts and the opponent surface.

Also, when the present invention is carried out, for example, the rolling sliding parts is a roller constituting a cam follower unit in which an outer peripheral surface of a roller supported rotatably around a roller supporting shaft is brought into contact with an outer peripheral surface of a cam via a rolling contact.

If the present invention is applied to such roller, such a situation can be prevented that the metal contact that results in an early flaking can be generated on the outer peripheral surface of the roller that contacts the outer peripheral surface of the cam via a rolling contact at a high surface pressure in use, and thus the durability of this roller can be sufficiently secured.

Alternately, the rolling sliding parts is a rocker arm into a part of which a cam follower unit is incorporated.

If the present invention is applied to such rocker arm, such a situation can be prevented that the metal contact that results in an early flaking can be generated on the engaging portion against which the base end face of the engine valve or the top end face of the rush adjuster is hit in use, and thus the durability of this rocker arm can be sufficiently secured. Also, a force required to displace the rocker arm can be lowered by reducing a sliding friction between the base end face of the engine valve or the top end face of the rush adjuster and the engaging portion, and thus the improvement of the output of the engine and the fuel consumption performance can be achieved.

Alternately, the rolling sliding parts is an inner ring having a cylindrical inner ring raceway on an outer peripheral surface or a shaft.

Alternately, the rolling sliding parts is a needle that is provided rollably between a cylindrical inner ring raceway and a cylindrical outer ring raceway.

If the present invention is applied to such inner ring, such shaft, or such needle, such a situation can be prevented that the metal contact that results in an early flaking can be generated on the rolling surface of the needle or the inner ring raceway that contacts the rolling surface via a rolling contact, and thus the durability of this needle, the inner ring having the inner ring raceway, or the shaft can be sufficiently secured.

Also, when the present invention is carried out, it is preferable that the reaction layer made of phosphate compound consisting of phosphorus and iron, as set forth in above Patent Literature 8, should be formed on at least the portion, which contacts the opponent parts via a rolling contact or a sliding contact, out of the surface of the rolling sliding parts, and then the process layer, which is obtained by burning a mixture of molybdenum disulfide and poly(tetrafluoroethylene) together with a thermosetting synthetic resin using a polyamideimide resin as the binder, should be stacked on the surface of this reaction layer.

If such configuration is employed, both peripheral surfaces can be protected (the generation of the roughnesses such as the harmful abrasion, or the like can be prevented) until the lubricating oil spreads to the contact area between the surface of the rolling sliding parts and the surface of the other member immediately after the running of the machine such as the engine, or the like, into which the rolling sliding parts is incorporated, is started for the first time.

Embodiment 1

Figure 2:
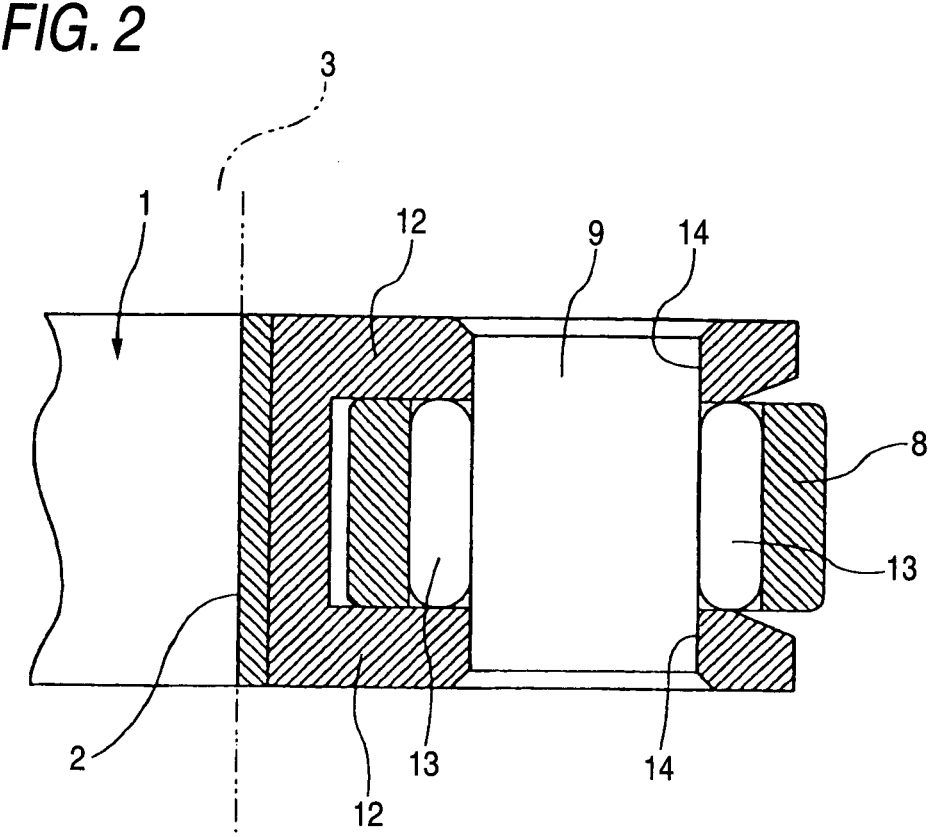
FIG. 2 An enlarged sectional view taken along an A-A line in FIG. 1.
Figure 3:
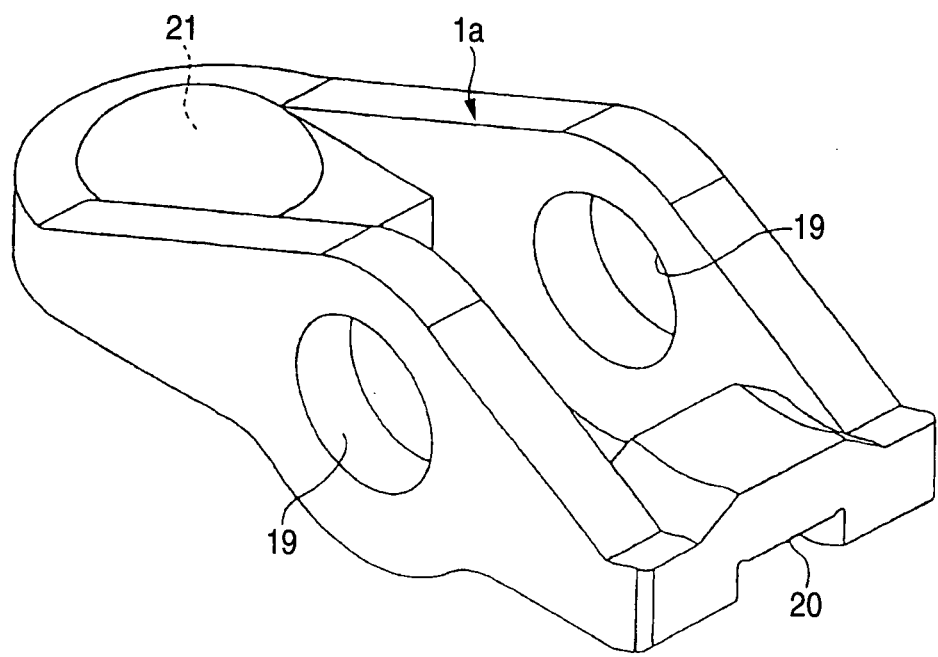
FIG. 3 A perspective view showing an example of the rocker arm as one type of the rolling sliding parts as the object of the present invention.
Figure 4:
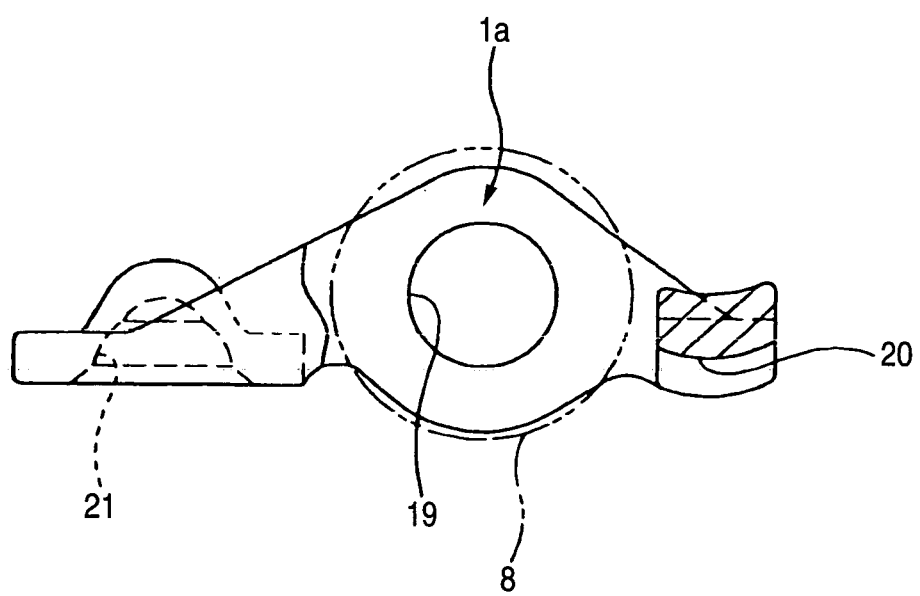
FIG. 4 A partially sectioned side view showing the same.

The surface finishing was applied to the roller 8 (see FIGS. 1 and 2) made of bearing steels, which is one type of the rolling sliding parts, by the barrel finishing. The conditions of the barrel finishing were set differently in two ways as follows.

Figure 5A:
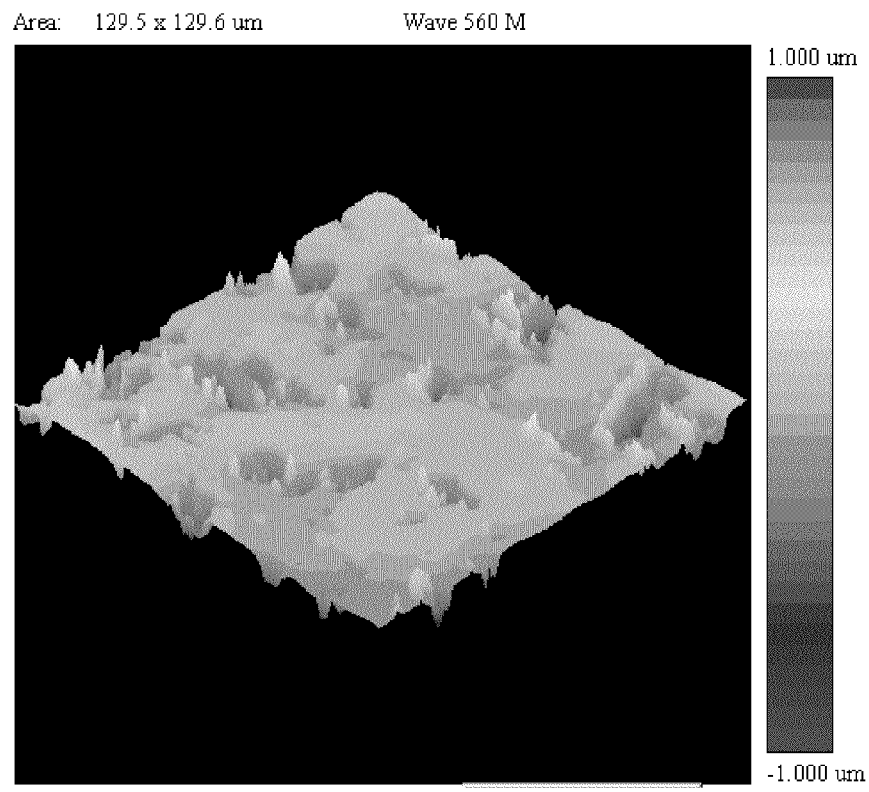
FIGS. 5(A) and (B) Microphotographs of a surface structure of the roller belonging to a technical scope of the present invention.
Figures 6A, 6B, 6C, 6D, 6E:
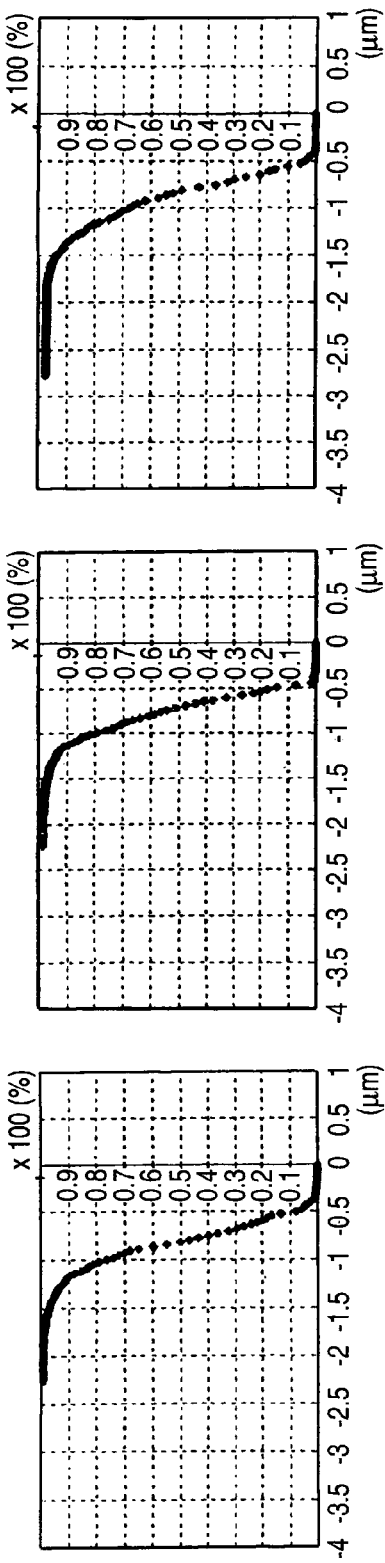
FIGS. 6 (A) to (I) Graphs obtained by classifying distributions of the surface structures.
Figure 6:
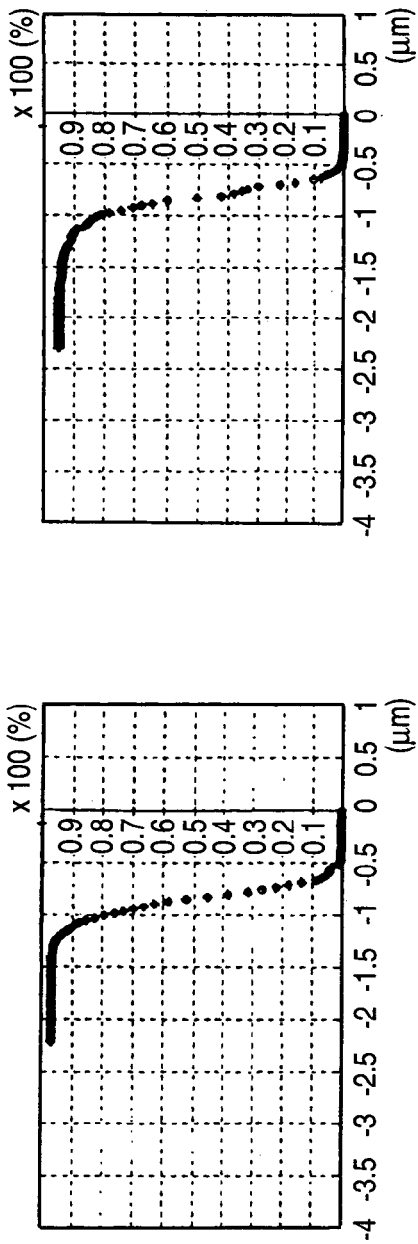
Figure 6:
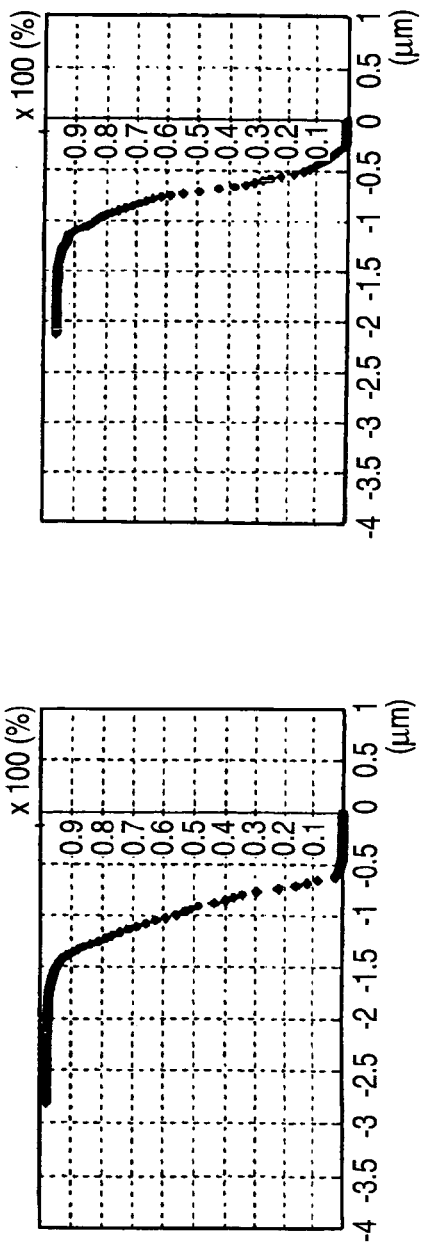
Figure 6:
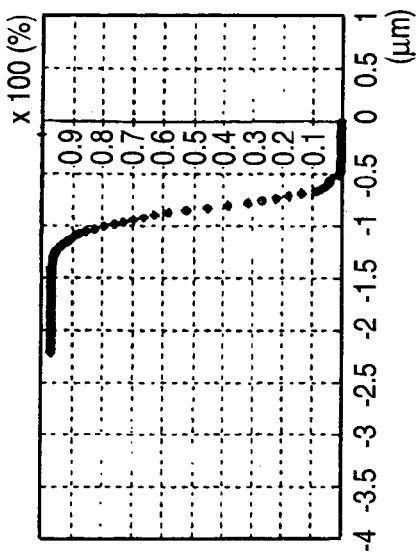
Figure 6:
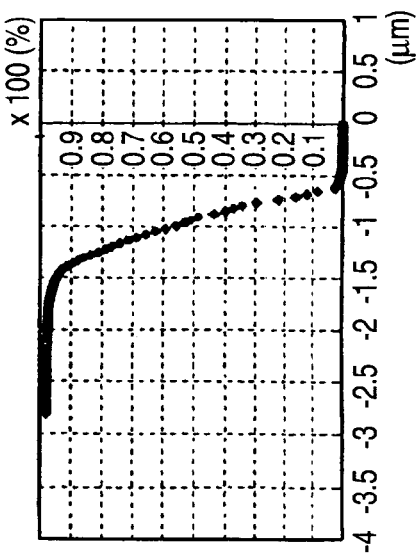

[Conditions 1]
Volume of the pot: 30 L
Rotation speed of the pot: 130 to 150 $min^{-1}$
Inserted amount of the compound: 90 to 110 cc
Process time: 20 to 25 min
[Conditions 2]
Volume of the pot: 80 L
Rotation speed of the pot: 190 to 210 $min^{-1}$
Inserted amount of the compound: 190 to 210 cc
Process time: 10 to 15 min The conditions 1 were applied to get the roller 8 constituting the cam follower unit as the rolling sliding parts that belongs to a technical scope of the present invention. Two examples of the microphotograph obtained by shooting fine shapes on the surface of the roller 8 under the conditions 1 are shown in FIGS. 5(A)(B). Also, nine examples of the graphs showing the analyzed results of the fine shapes on the surface of the roller 8 under the conditions 1 are shown in FIGS. 6(A) to (I). An abscissa of FIG. 6 denotes a height set on the basis of the outermost surface (a top portion of the mostly projected portion among the observed surfaces), and a unit is am. In FIG. 6, "−1" indicates a position located at a depth of 1 µm from the outermost surface, and "−2" indicates a position located at a depth of 0.2 µm from the outermost surface. Also, an ordinate of FIG. 6 denotes a ratio of a sectional area at that depth. For example, when the graph is observed along the curve depicted in FIG. 6(A), an event that a "−1" portion on the abscissa corresponds to almost 0.8 on the ordinate signifies that a sectional area of the portion positioned at a depth of 1 µm from the outermost surface is 0.8 (80%) of the overall surface area.

Figure 7A:
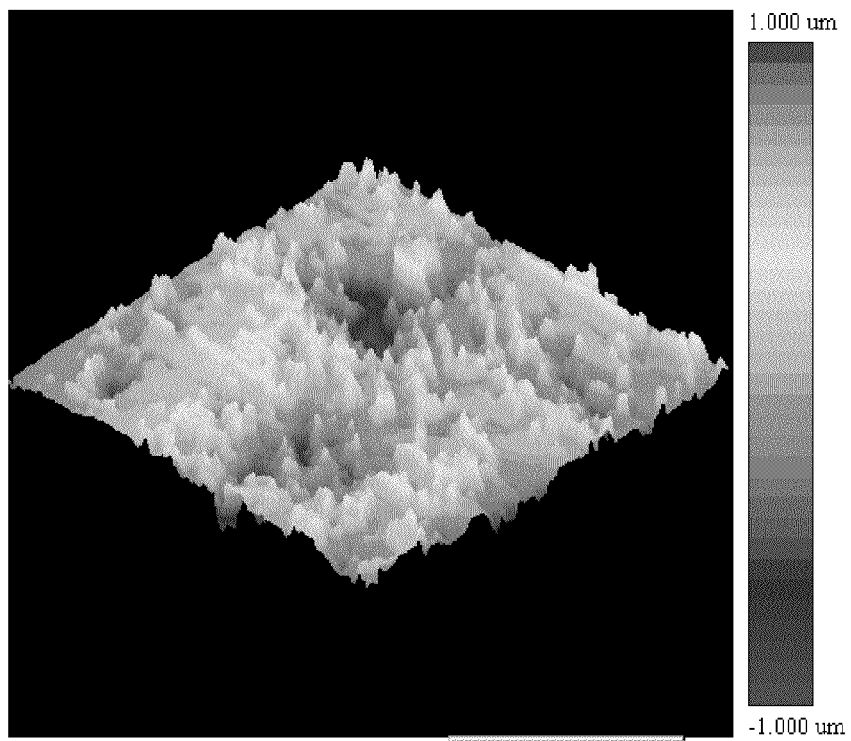
FIGS. 7(A) and (B) Microphotographs of a surface structure of the roller out of a technical scope of the present invention.

Also, the conditions 2 were the conditions applied when the roller is out of a technical scope of the present invention. Two examples of the microphotograph obtained by shooting fine shapes on the surface of the roller 8 under the conditions 2 are shown in FIGS. 7(A)(B). Also, nine examples of the graphs showing the analyzed results of the fine shapes on the surface of the roller 8 under the conditions 2 are shown in FIGS. 8(A) to (I). The meanings of an abscissa and an ordinate of FIG. 8 are identical to those in FIG. 6.

Figure 5B:
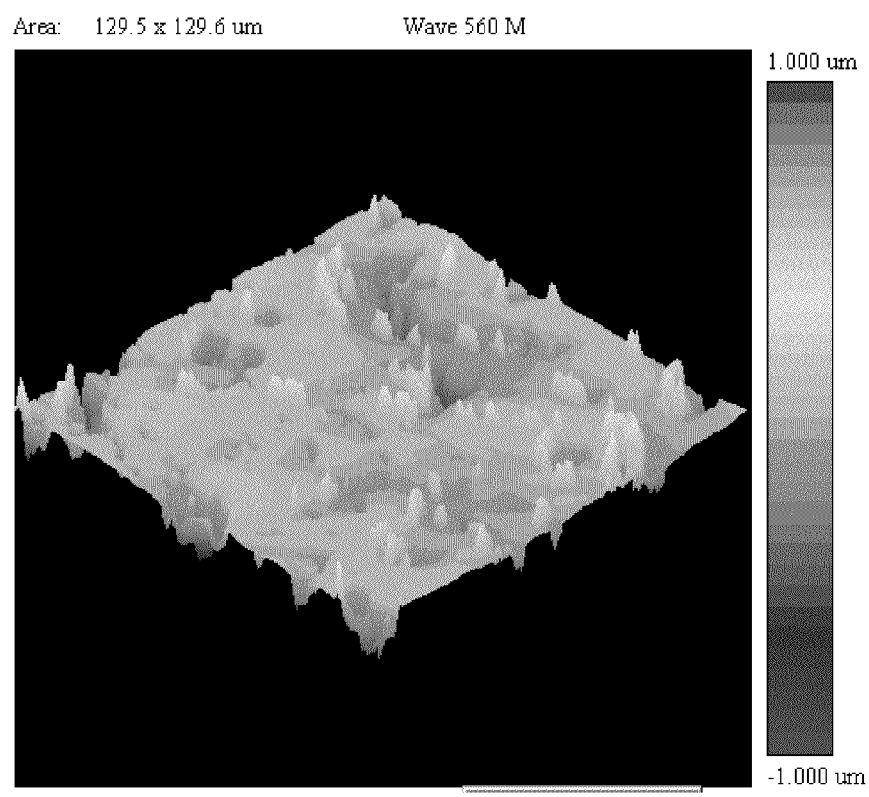
Figure 7B:
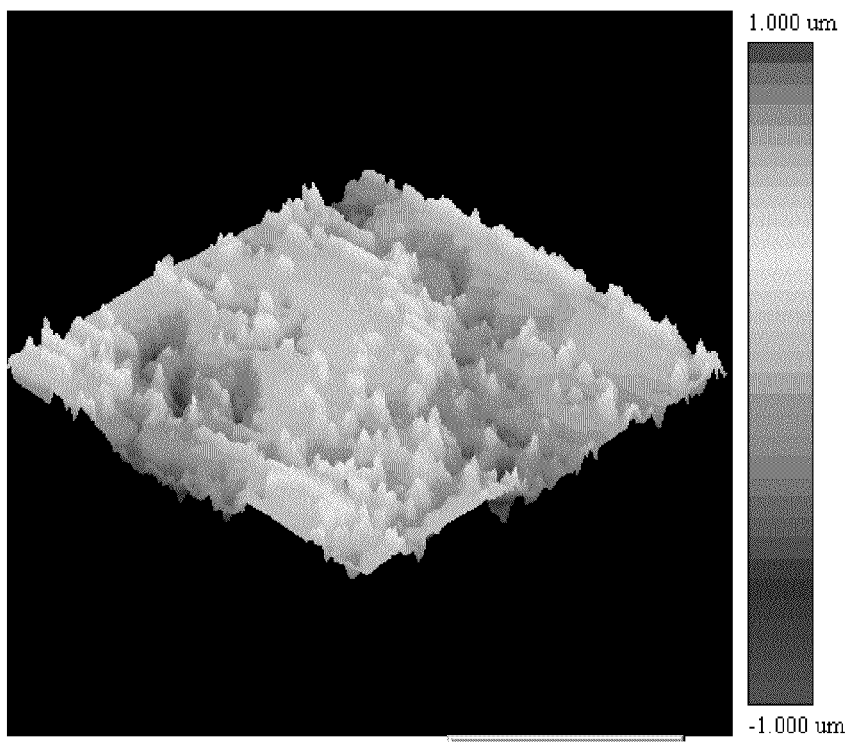
Figure 8A:
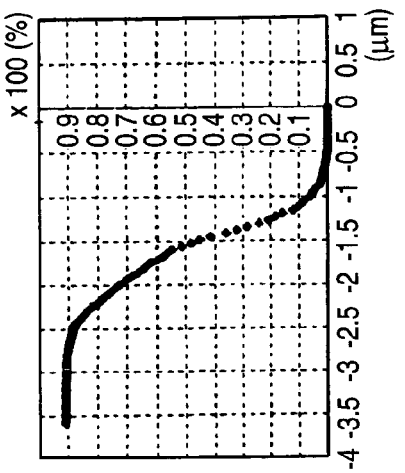
Figure 8B:
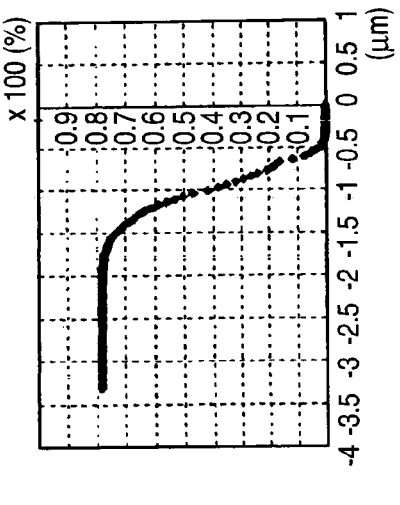
Figure 8C:
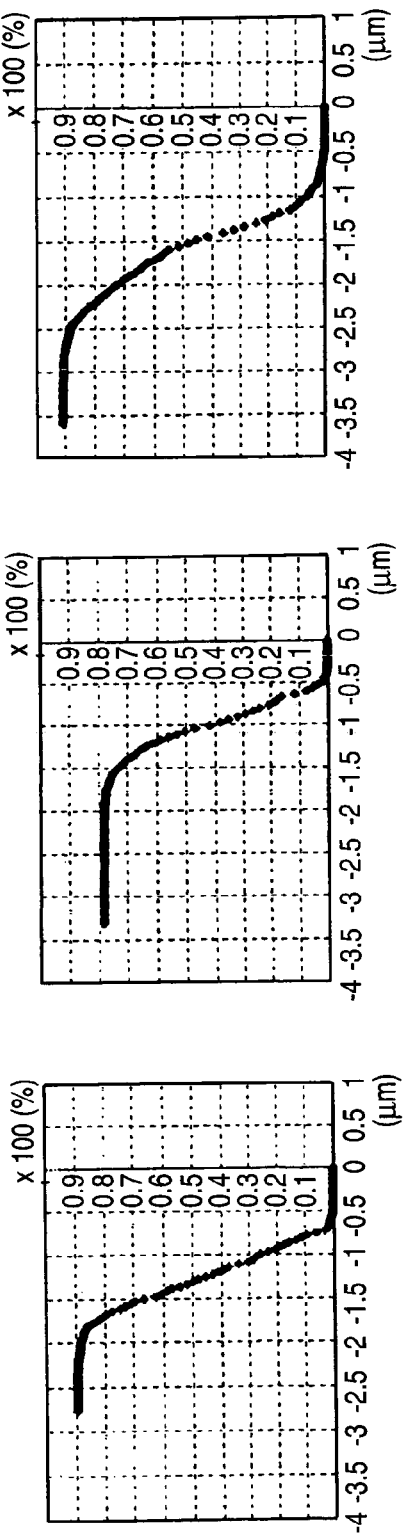
Figure 8D:
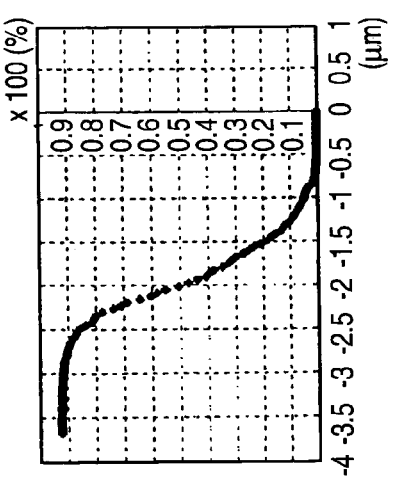
Figure 8E:
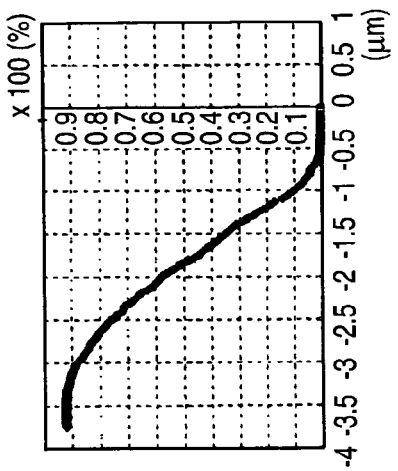
Figure 9:
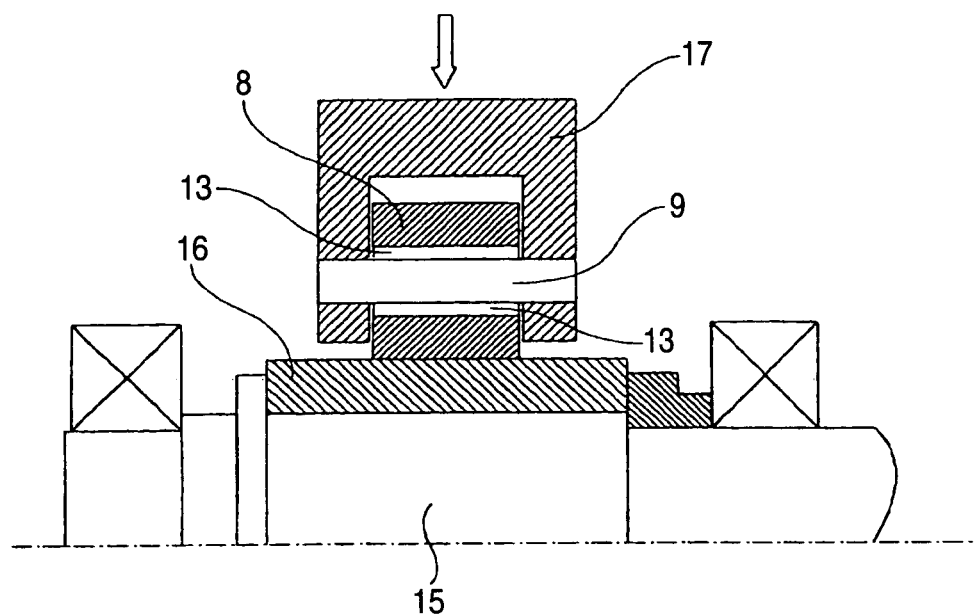
FIG. 9 A sectional view of the durability testing machine.

In order to confirm the effect of the present invention constructed as above, the roller 8 having the surface properties that belong to a technical scope of the present invention, as shown in FIG. 5 and FIG. 6, and the roller 8 having the surface properties that are out of a technical scope of the present invention, as shown in FIG. 7 and FIG. 8, were fitted into the testing machine shown in FIG. 9, and then a test for durability of the roller 8 was carried out. This testing machine had such a configuration that the outer peripheral surface of the roller 8, which is fitted rotatably to a supporting member 17 via the roller supporting shaft 9 and a plurality of needles 13, 13, was pushed against the outer peripheral surface of a driving roller 16 fitted to a main shaft 15 that is driven by a motor (not shown). Then, the driving roller 16 together with the main shaft 15 was rotated while applying the radial load to the roller supporting shaft 9 via the supporting member 17. Since the roller 8 was rotated following upon the rotation of the driving roller 16, a durability test of the roller 8 as a test piece could be carried out in line with the situation that the roller 8 was incorporated actually into the engine.

The testing conditions were given as follows.

Rotation speed of the roller 8: 6000 $min^{-1}$

Radial load: 1960 N

Lubricating oil: engine oil

Temperature of the lubricating oil: 100° C.

Dropped amount of the lubricating oil: dropped between the rolling 8 and the driving roller 16 at 0.1 cc/min Under such conditions, the durability test of the roller 8 was applied to the roller 8 having the surface shape shown in FIGS. 5(A)(B) and the roller 8 having the surface shape shown in FIGS. 7(A)(B) respectively. In order to check whether or not the abnormal vibration is generated, the durability test was continued until 400 hours have elapsed. As a result, in the roller 8 having the surface shape shown in FIGS. 7(A)(B), the abnormal vibration was generated based on the surface flaking as a point of time when 350 hours and 379 hours have elapsed respectively. In contrast, in the roller 8 having the surface shape shown in FIGS. 5(A)(B), no abnormal vibration was generated as a point of time when 400 hours have elapsed and therefore the durability test was stopped at that time.

As apparent from above FIGS. 5 to 8 and the results of the above durability test, a distribution of depths could be suppressed narrowly (a distance from the mostly projected portion to the mostly depressed portion in the depth direction could be suppressed small) by applying the barrel finishing under the conditions 1. In the case of the roller 8 having such surface shape, generation of the metal contact between the roller and the opponent surface in running could be prevented by forming the tough oil film between the roller and the opponent surface, and thus the durability of the roller 8 itself and the other member such as the cam, or the like could be ensured. In contrast, in case the barrel finishing was applied, a distribution of depths was wide (a distance from the mostly projected portion to the mostly depressed portion in the depth direction became large). Also, In the case of the roller 8 having such surface shape, the tough oil film could not be formed between the roller and the opponent surface and thus the metal contact was ready to generate between the roller and the opponent surface during the running. Therefore, it became difficult to secure the durability of the roller 8 itself and the other member such as the cam, or the like.

Embodiment 2

Concrete procedures of the barrel finishing applied to get the more preferable surface properties of the roller constituting the cam follower unit as one type of the rolling sliding parts of the present invention will be explained hereunder. In the case of this method, first the rough finishing was applied to the surface of the roller and then the finishing process was applied to this surface. This rough finishing process was executed by turning the pots in a state that a plurality of rollers as the workpiece, and a number of alumina balls whose diameter is about 4 mm respectively, the compounds, and the surfactant serving as the media were put into the pots. In the rough finishing process executed in this manner, the fine abrasions were caused on the surface by rubbing the compounds against the surfaces of respective rollers by using a number of alumina balls. Also, in the finishing process, the pots were turned in a state that a plurality of rollers as the workpiece, and a number of alumina balls similar to those used in the rough finishing process and the surfactant were put into the pots. The compounds were not used. In the finishing process executed in this manner, fine edge portions on the surfaces of the rollers scratched by the compounds were rounded by rubbing the surfaces of the rollers by a number of alumina balls under a condition that a slide of the surface of the roller was made smooth by the surfactant.

The rough finishing process and the finishing process were carried out by changing a time of the finishing process into three ways in a range 15 min to 25 min while a time of the rough finishing process was fixed to 10 min, and then the influence caused by a difference of a finishing process time was detected. The conditions and the results of such experiment were given in following Table 1.

TABLE 1

| Process time rough/finish (min) | 10/25 | 10/20 | 10/15 |
|---|---|---|---|
| Rough/finish process time ratio (%) | 40 | 50 | 67 |
| Sectional area ratio in the 2 μm position from the outermost surface | 90% | 90% | 70% |
| Sectional area ratio in the 1 μm position from the outermost surface | 55% | 80% | 40% |
| Durability | ○ | ◎ | Δ |

As apparent from this Table 1, in the case where a rate of a time of the rough finishing process to a time of the finishing process was small (a rough/finish process time ratio was small (40% or less)), a minimum necessary amount of durability could be secured, nevertheless the enough durability could not always be secured when the working conditions became severe (a mark ○). The reason why a minimum necessary amount of durability could be secured is that, because a ratio of the sectional area at a portion that is positioned at a depth of 2 μm from the outermost surface position of the roller is large, generation of the metal contact that results in an early flaking at that portion can be prevented can be prevented by enhancing a strength of the oil film existing between the surface of the roller and the opponent surface if the lubricating conditions are good. In contrast, the reason why the enough durability could not always be secured when the working conditions became severe is that, because a smooth surface formed with much effort is processed once again by the excessive finishing process, a ratio of the sectional area at a portion that is positioned at a depth of 1 μm from the outermost surface position is not always sufficiently large. Namely this is because the lubricating oil existing on the rolling contact portions of the surface of the roller and the surface of the other member could not always be ensured when the lubricant working conditions became severe (a supplied amount of the lubricating oil is lacking).

Also, in the case where a rate of a time of the rough finishing process to a time of the finishing process was proper (a rough/finish process time ratio was proper (40% or more but 60% or less)), the enough durability could be secured even when the working conditions were severe (a mark ◎). The reason for this is that, because a smooth surface exists appropriately on the surface and also a ratio of the sectional area at not only a portion positioned at a depth of 2 μm from the outermost surface position of the roller but also a portion positioned at a depth of 1 μm from the outermost surface position was large, a strength of the oil film existing between the surface of the roller and the opponent surface can be enhanced and also the sufficient lubricating oil could be supplied to the rolling contact portions of the surface of the roller and the surface of the other member even if the working conditions were severe.

In addition, in the case where a rate of a time of the rough finishing process to a time of the finishing process was large (a rough/finish process time ratio was too large (60% or more)), a minimum necessary amount of durability could be secured, but it is possible that the durability could not be secured even when the working conditions were severe in some small (a mark Δ). This is because a ratio of the sectional area at a portion that is positioned at a depth of 2 μm from the outermost surface position of the roller is small and a strength of the oil film existing between the surface of the roller and the opponent surface was lowered.

Here, when the present invention is carried out, preferably following conditions should be employed as the conditions applied to the pots used in the barrel finishing.

Figure 10:
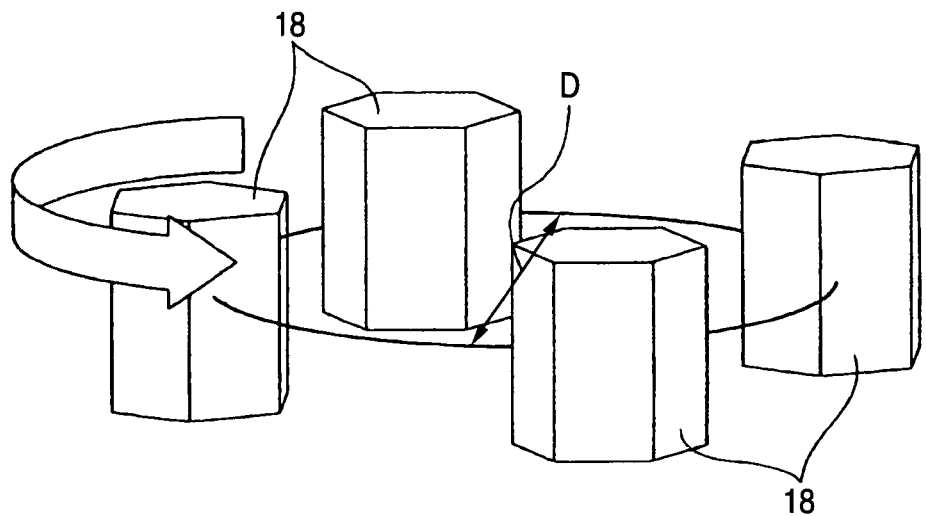
FIGS. 10(A) and (B) Schematic views showing two examples of the direction along which the pots are arranged in the barrel finishing machine.
Figure 10:
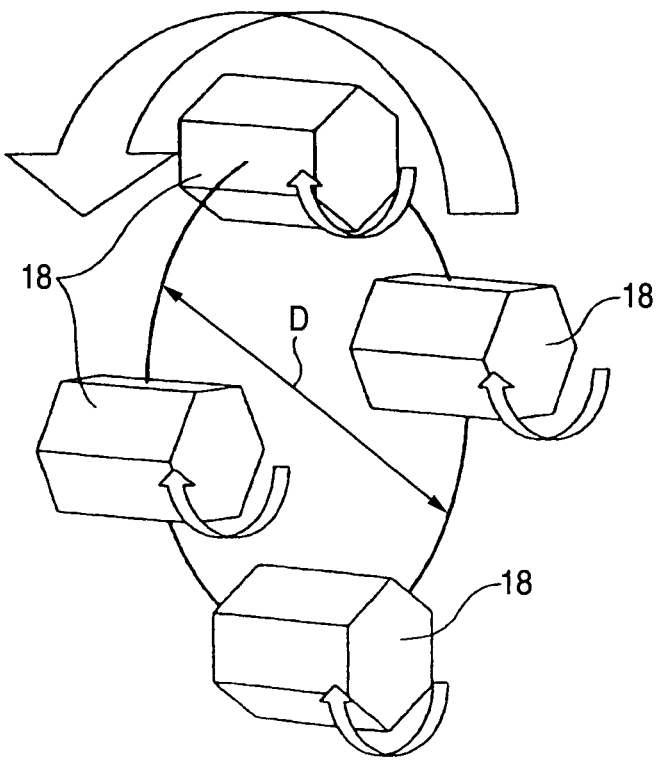

First, as the barrel finishing machine, there are the machine having such a configuration that the central axis of plural (four in the illustrated example) pots 18, 18 is arranged in the vertical direction, as shown in FIG. 10(A), and the machine having such a configuration that the central axis of the pots 18, 18 is arranged in the horizontal direction, as shown in FIG. 10(B). When the present invention is carried out, preferably the machine having the configuration in which the central axis of the pots 18, 18 is arranged in the horizontal direction, as shown in FIG. 10(B), should be employed. The reason for this is that, in the case of the configuration shown in FIG. 10(B), a quantity of motion of the workpieces, the media, and the like put in the pots 18, 18 can be increased because respective pots 18, 18 can be swung with the revolution and thus a processing efficiency can be enhanced (a processing time can be reduced).

Also, when the barrel finishing machine as shown in FIG. 10(B) is employed, preferably X/V=36 to 40% should be satisfied, where V is a volume of the pot 18 and X is a total volume of the workpieces (rollers) put into these pots 18, 18.

The present invention is explained in detail with reference to particular embodiments. But it is apparent for those skilled in the art that various variations and modifications can be applied without departing a spirit and a scope of the present invention.

This application is based upon
Japanese Patent Application (Patent Application No. 2004-043962) filed on Feb. 20, 2004,
Japanese Patent Application (Patent Application No. 2004-345143) filed on Nov. 30, 2004, and
Japanese Patent Application (Patent Application No. 2005-030254) filed on Feb. 7, 2005;
the contents of which are incorporated herein by reference.

INDUSTRIAL APPLICABILITY

Like the present invention, there is provided the technical idea that can form the fine roughnesses existing on the surface of the cylindrical member or the circular column member, which contacts the surface of the other member via a rolling contact, by the barrel finishing, and can realize the structure having excellent durability at a low cost by restraining the properties of the fine roughnesses. The application of this technical idea is not limited to the roller constituting the cam follower unit, the rocker arm into a part of which the cam follower unit is incorporated, and the inner ring having the cylindrical inner ring raceway on its outer peripheral surface or the shaft. Such technical idea can be applied to the rolling surface of the rollers constituting the roller bearing.

Also, in the case of the cam follower unit, the present invention can be applied to the shaft or the roller constituting the single roller type cam follower unit in which the inner peripheral surface of the roller is brought into contact with the outer peripheral surface of the shaft via a sliding contact without the needle bearing. Alternately, the present invention can be applied to the shaft or both inner and outer rollers constituting the double roller type cam follower unit in which the inner roller is provided between the outer peripheral surface of the shaft and the inner peripheral surface of the outer roller.

Also, the present invention can be applied to the radial needle bearing and its neighboring constituent parts, which supports rotatably the planet gear constituting the planet gear transmission around the planetory shaft provided to the planet carrier, in addition to the cam follower unit. In this case, as the rolling sliding surface as the object of the feature portion of the present invention, the outer peripheral surface (inner ring raceway) of the planet shaft, the inner peripheral surface (outer ring raceway) of the planet gear, the rolling surface of each needle, both end fades of the planet gear in the axial direction, the side surface of the supporting plate constituting the planet carrier opposing to both end faces, and the like can be considered.

Also, it is useful that the present invention is applied to the outer peripheral surface of the shaft set forth on above Patent Literature 7. In this case, the shaft is made of the steel that contains C of 0.5 to 1.2 wt % and N of 0.05 to 0.4 wt %, as described above. Then, the surface layer having a hardness of Hv650 or more and containing a retained austenite of 15 to 40 vol % is formed by the induction hardening process, and also a retained austenite in the core portion is set to 0 vol %. In this case, the surface layer means a surface portion whose thickness is about 2% of a diameter of this shaft. Also, it is useful that the present invention is applied to the rolling element (needle, roller, ball) that has the similar composition and the similar surface layer.

Also, in all cases, it is useful that the reaction layer and the process layer set forth in above Patent Literature 8 are stacked on the rolling sliding surface as the object of the feature portion of the present invention.

Further, the present invention can be applied to the parts that minutely displaces from the opponent surface at a high face pressure, like the end surface of the plunger for the fuel injection equipment.

The invention claimed is:

1. A rolling sliding parts including a surface which contacts another member via a rolling contact or a sliding contact,
    wherein an occupation ratio is set from 90% or more to less than 100%,
    wherein the occupation ratio is calculated by dividing a sectional area of a virtual plane in a plane direction at a portion that is positioned at a depth of 2.0 μm from an outermost surface position by an area of an overall surface of a portion that contacts the other member, and
    wherein the outermost surface position is defined as a position of a highest portion out of fine roughnesses existing on the surface.

2. A rolling sliding parts including a surface which contacts another member via a rolling contact or a sliding contact,
    wherein an occupation ratio is set from 80% or more to less than 100%,
    wherein the occupation ratio is calculated by dividing a sectional area of a virtual plane in a plane direction at a portion that is positioned at a depth of 1.5 μm from an outermost surface position by an area of an overall surface of a portion that contacts the other member, and
    wherein the outermost surface position is defined as a position of a highest portion out of fine roughnesses existing on the surface.

3. A rolling sliding parts including a surface which contacts another member via a rolling contact or a sliding contact in use,
 wherein an occupation ratio is set from 50% or more to less than 100%,
 wherein the occupation ratio is calculated by dividing a sectional area of a virtual plane in a plane direction at a portion that is positioned at a depth of 1.0 μm from an outermost surface position by an area of an overall surface of a portion that contacts the other member, and
 wherein the outermost surface position is defined as a position of a highest portion out of fine roughnesses existing on the surface.

4. A rolling sliding parts according to claim 1, wherein an occupation ratio of a sectional area of a virtual plane in a plane direction at a portion that is positioned at a depth of 1.5 μm from the outermost surface position to the area of the surface that contacts the other member is set to 80% or more.

5. A rolling sliding parts according to claim 1, wherein an occupation ratio of a sectional area of a virtual plane in a plane direction at a portion that is positioned at a depth of 1.0 μm from the outermost surface position to the area of the surface that contacts the other member is set to 50% or more.

6. A rolling sliding parts according to claim 1, wherein an occupation ratio of a sectional area of a virtual plane in a plane direction at a portion that is positioned at a depth of 1.5 μm from the outermost surface position to the area of the surface that contacts the other member is set to 80% or more, and also an occupation ratio of a sectional area of a virtual plane in a plane direction at a portion that is positioned at a depth of 1.0 μm from the outermost surface position to the area of the surface that contacts the other member is set to 50% or more.

7. A rolling sliding parts according to claim 1, wherein the rolling sliding parts is a roller constituting a cam follower unit in which an outer peripheral surface of the roller supported rotatably around a roller supporting shaft is brought into contact with an outer peripheral surface of a cam via a rolling contact.

8. A rolling sliding parts according to claim 2, wherein the rolling sliding parts is a roller constituting a cam follower unit in which an outer peripheral surface of the roller supported rotatably around a roller supporting shaft is brought into contact with an outer peripheral surface of a cam via a rolling contact.

9. A rolling sliding parts according to claim 3, wherein the rolling sliding parts is a roller constituting a cam follower unit in which an outer peripheral surface of the roller supported rotatably around a roller supporting shaft is brought into contact with an outer peripheral surface of a cam via a rolling contact.

10. A rolling sliding parts according to claim 4, wherein the rolling sliding parts is a roller constituting a cam follower unit in which an outer peripheral surface of the roller supported rotatably around a roller supporting shaft is brought into contact with an outer peripheral surface of a cam via a rolling contact.

11. A rolling sliding parts according to claim 5, wherein the rolling sliding parts is a roller constituting a cam follower unit in which an outer peripheral surface of the roller supported rotatably around a roller supporting shaft is brought into contact with an outer peripheral surface of a cam via a rolling contact.

12. A rolling sliding parts according to claim 6, wherein the rolling sliding parts is a roller constituting a cam follower unit in which an outer peripheral surface of the roller supported rotatably around a roller supporting shaft is brought into contact with an outer peripheral surface of a cam via a rolling contact.

13. A rolling sliding parts according to claim 1, wherein the rolling sliding parts is a rocker arm into a part of which a cam follower unit is incorporated.

14. A rolling sliding parts according to claim 2, wherein the rolling sliding parts is a rocker arm into a part of which a cam follower unit is incorporated.

15. A rolling sliding parts according to claim 3, wherein the rolling sliding parts is a rocker arm into a part of which a cam follower unit is incorporated.

16. A rolling sliding parts according to claim 4, wherein the rolling sliding parts is a rocker arm into a part of which a cam follower unit is incorporated.

17. A rolling sliding parts according to claim 5, wherein the rolling sliding parts is a rocker arm into a part of which a cam follower unit is incorporated.

18. A rolling sliding parts according to claim 6, wherein the rolling sliding parts is a rocker arm into a part of which a cam follower unit is incorporated.

19. A rolling sliding parts according to claim 1, wherein the rolling sliding parts is an inner ring having a cylindrical inner ring raceway on an outer peripheral surface or a shaft.

20. A rolling sliding parts according to claim 2, wherein the rolling sliding parts is an inner ring having a cylindrical inner ring raceway on an outer peripheral surface or a shaft.

21. A rolling sliding parts according to claim 3, wherein the rolling sliding parts is an inner ring having a cylindrical inner ring raceway on an outer peripheral surface or a shaft.

22. A rolling sliding parts according to claim 4, wherein the rolling sliding parts is an inner ring having a cylindrical inner ring raceway on an outer peripheral surface or a shaft.

23. A rolling sliding parts according to claim 5, wherein the rolling sliding parts is an inner ring having a cylindrical inner ring raceway on an outer peripheral surface or a shaft.

24. A rolling sliding parts according to claim 6, wherein the rolling sliding parts is an inner ring having a cylindrical inner ring raceway on an outer peripheral surface or a shaft.

25. A rolling sliding parts according to claim 1, wherein the rolling sliding parts is a needle that is provided rollably between a cylindrical inner ring raceway and a cylindrical outer ring raceway.

26. A rolling sliding parts according to claim 2, wherein the rolling sliding parts is a needle that is provided rollably between a cylindrical inner ring raceway and a cylindrical outer ring raceway.

27. A rolling sliding parts according to claim 3, wherein the rolling sliding parts is a needle that is provided rollably between a cylindrical inner ring raceway and a cylindrical outer ring raceway.

28. A rolling sliding parts according to claim 4, wherein the rolling sliding parts is a needle that is provided rollably between a cylindrical inner ring raceway and a cylindrical outer ring raceway.

29. A rolling sliding parts according to claim 5, wherein the rolling sliding parts is a needle that is provided rollably between a cylindrical inner ring raceway and a cylindrical outer ring raceway.

30. A rolling sliding parts according to claim 6, wherein the rolling sliding parts is a needle that is provided rollably between a cylindrical inner ring raceway and a cylindrical outer ring raceway.

* * * * *